(12) United States Patent
Schillinger

(10) Patent No.: US 6,909,845 B1
(45) Date of Patent: Jun. 21, 2005

(54) CAMERA LINE SUPPORT DEVICE

(76) Inventor: Marvin V. Schillinger, 2327 9th Ave., Bloomer, WI (US) 54724

( * ) Notice: Subject to any disclaimer, the term of this patent is extended or adjusted under 35 U.S.C. 154(b) by 0 days.

(21) Appl. No.: 10/972,218

(22) Filed: Oct. 25, 2004

(51) Int. Cl.[7] .............................................. G03B 17/08
(52) U.S. Cl. .................................. 396/25; 43/4; 348/81
(58) Field of Search .............................. 396/19, 25, 28; 348/81, 84, 85; 43/1, 4, 17

(56) References Cited

U.S. PATENT DOCUMENTS

| | | | |
|---|---|---|---|
| 2,914,926 A | * | 12/1959 | Meagher ..................... 138/156 |
| 4,226,508 A | | 10/1980 | Michaels et al. |
| 4,642,932 A | | 2/1987 | Austin |
| 4,685,240 A | | 8/1987 | Fralick |
| 4,747,226 A | * | 5/1988 | Todd ............................... 43/4 |
| 4,780,979 A | | 11/1988 | Dyck et al. |
| 4,805,336 A | | 2/1989 | Heyerman |
| 4,823,494 A | | 4/1989 | Waterman |
| 4,993,182 A | | 2/1991 | Monsen |
| 5,044,108 A | | 9/1991 | Rinehart |
| 5,048,220 A | * | 9/1991 | Harris ............................... 43/4 |
| 5,778,259 A | | 7/1998 | Rink |
| 5,956,882 A | | 9/1999 | Deimel |
| 6,097,424 A | | 8/2000 | Zernov et al. |
| 6,262,761 B1 | | 7/2001 | Zernov et al. |
| 6,476,853 B1 | | 11/2002 | Zernov et al. |
| 6,724,986 B1 | | 4/2004 | Sicher |
| 6,751,900 B1 | | 6/2004 | Paulson et al. |
| 6,772,551 B1 | | 8/2004 | Bielinski, Sr. et al. |
| 2002/0196230 A1 | | 12/2002 | Struyk |

* cited by examiner

Primary Examiner—David M. Gray
(74) Attorney, Agent, or Firm—Tipton L. Randall

(57) ABSTRACT

The invention is a camera line support device, adapted for use in an ice fishing hole. The camera line support device includes a cylindrical sleeve member having an inner surface, an outer surface, an open top end and an open bottom end. A sleeve support member is secured to the sleeve member's outer surface adjacent the open top end thereof. A protruding tab member extends from the cylindrical sleeve member, the tab member having a slot therein adapted to accept a video camera cable line therein, with the cable line extending through the cylindrical sleeve member. A stop on the cable line contacts the protruding tab member to suspend the video camera at a selected depth.

20 Claims, 9 Drawing Sheets

CAMERA LINE SUPPORT DEVICE

CROSS-REFERENCE TO RELATED APPLICATIONS, IF ANY

Not applicable.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to fishing equipment and, more particularly, to a support device for an underwater camera and, most particularly, to a support device for an underwater camera used for ice fishing.

2. Background Information

Underwater surveillance cameras are used for viewing underwater objects from a boat, a dock, or from the frozen surface of a body of water. These underwater cameras are particularly popular with fishermen who want to explore the underwater structure of lakes or streams, as well as observe the presence or absence of fish in particular locations. Underwater cameras are typically housed in a cylindrical case about the size of a small soup can. A length of cable connects the camera to a small viewing screen on an above-water unit that also contains a power source, such as a battery. In open water, the underwater camera is easily moved from one location to another and there is sufficient space for fisherman to drop a baited fishing line in the vicinity of the camera.

When ice fishing, a fisherman must drill one or more holes in the ice in order to present the bait to the fish. Although the underwater camera can be lowered into the ice fishing hole to observe the presence or absence of fish and then removed from the ice fishing hole during fishing, many fisherman find that it is useful to leave the camera and attached cable in the hole to observe the fish taking the bait. In this latter situation, the fisherman must manipulate both his fishing pole and line, as well as the cable and attached camera. As an alternative, a fisherman can drill two adjacent holes in the ice, one for fishing and the other for the camera and cable. This involves extra work and should the fisherman decide to move to a different location, drilling many additional holes is required.

A number of inventions concerning underwater cameras and fishing have been granted patents, including the following. U.S. Pat. No. 4,226,508 by Michaels et al.; U.S. Pat. No. 4,642,932 by Austin; U.S. Pat. No. 4,685,240 by Fralick; U.S. Pat. No. 4,780,979 by Dyck et al.; U.S. Pat. No. 4,805,336 by Heyerman; U.S. Pat. No. 4,823,494 by Waterman; U.S. Pat. No. 4,993,182 by Monsen; U.S. Pat. No. 5,044,108 by Rinehart; U.S. Pat. No. 5,778,259 by Rink; U.S. Pat. No. 5,956,882 by Deimel; U.S. Pat. No. 6,097,424 by Zemov et al.; U.S. Pat. No. 6,262,761 by Zemov et al.; U.S. Pat. No. 6,476,853 by Zernov et al.; U.S. Pat. No. 6,724,986 by Sicher; U.S. Pat. No. 6,751,900 by Paulson et al.; U.S. Pat. No. 6,772,551 by Bielinski, Sr., et al. and U.S. patent application No. 2002/0196230 by Struyk. None of these patents disclose or suggest the applicant's invention.

Applicant has devised an underwater camera line support device that adjustably positions a camera and cable at a selected depth below an ice fishing hole, while allowing the angler to fish in that same hole. In addition, the underwater camera line support device and attached camera are readily moved from one ice fishing hole to another with minimal effort.

SUMMARY OF THE INVENTION

The invention is directed to a camera line support device, adapted for use in an ice fishing hole. The camera line support device includes a cylindrical sleeve member having an inner surface, an outer surface, an open top end and an open bottom end. A sleeve support member is secured to the sleeve member's outer surface adjacent the open top end thereof. A protruding tab member extends from the cylindrical sleeve member, the tab member having a slot therein adapted to accept a video camera cable line therein, with the cable line extending through the cylindrical sleeve member.

In a preferred embodiment of the invention, the sleeve support member includes a continuous flange member encircling the sleeve member's outer surface and coplanar with the open top end thereof. The protruding tab member may extend collinearly from the cylindrical sleeve member or intersect the inner surface of the cylindrical sleeve member. The preferred embodiment also includes a carrying handle member pivotally affixed to the sleeve support member.

DESCRIPTION OF THE EMBODIMENTS

Nomenclature
10 Camera Line Support Device
15 Cylindrical Sleeve Member
20 Inner Surface of Sleeve Member
25 Outer Surface of Sleeve Member
30 Open Top End of Sleeve Member
35 Open Bottom End of Sleeve Member
40 Sleeve Support Member
45 Projecting Members of Sleeve Support 50 Continuous Flange Member
55 Protruding Tab Member
60 Cable Slot in Tab Member
65 Carrying Handle Member
70 Pivoting Connections of Handle Member
C Underwater Camera
L Cable Line to Camera
S Stop Attached to Cable Line
V Viewing Screen of Camera System
E Electronics Unit of Camera System
F Fishing Line
I Ice on Water
R Fishing Rod and Reel Construction The invention is a camera line support device, adapted for use in an ice fishing hole. The camera line support device includes a cylindrical sleeve member having an inner surface, an outer surface, an open top end and an open bottom end. A sleeve support member is secured to the sleeve member's outer surface adjacent the open top end thereof. A protruding tab member extends from the cylindrical sleeve member, the tab member having a slot therein adapted to accept a video camera cable line therein, with the cable line extending through the cylindrical sleeve member.

Figure 1:
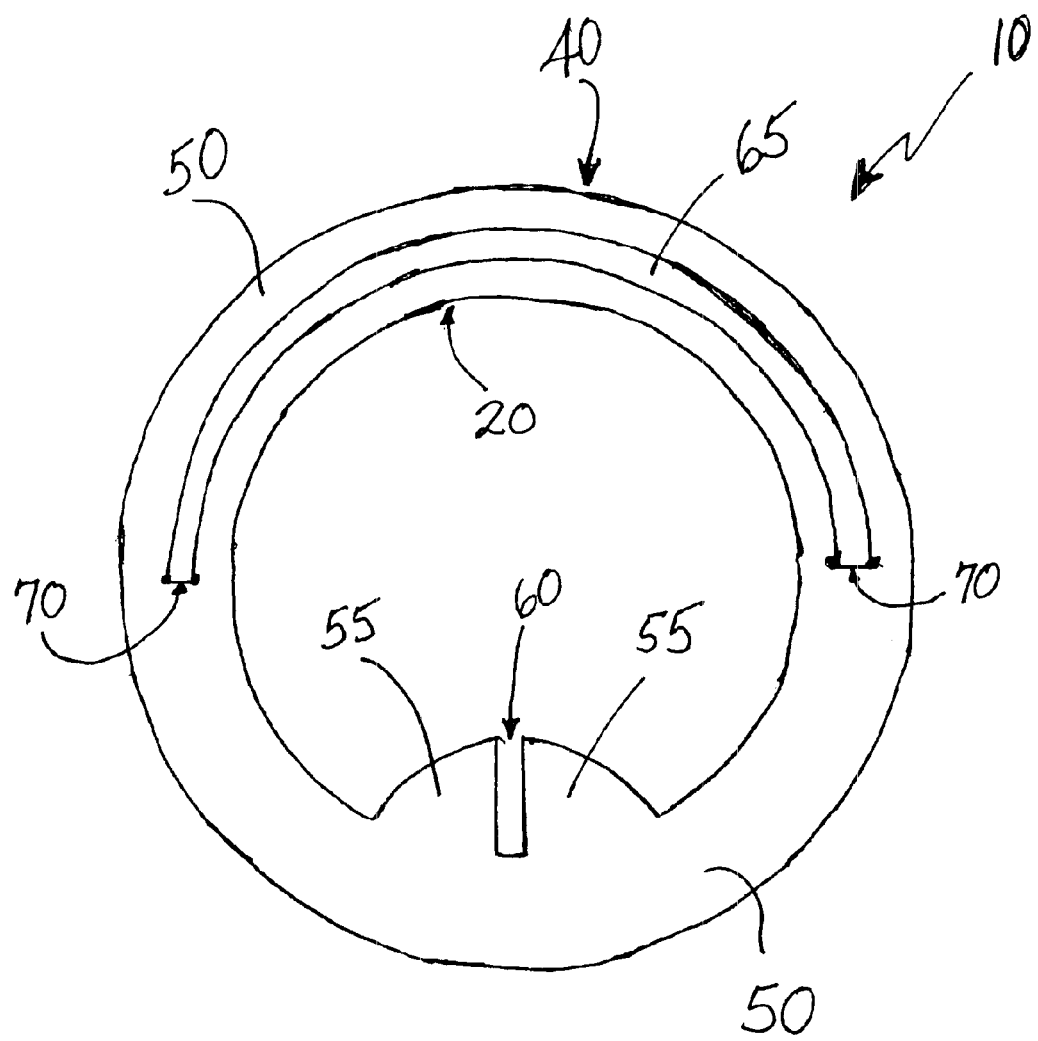
FIG. 1 is a top plan view of one embodiment of the camera line support device of the present invention.
Figure 2:
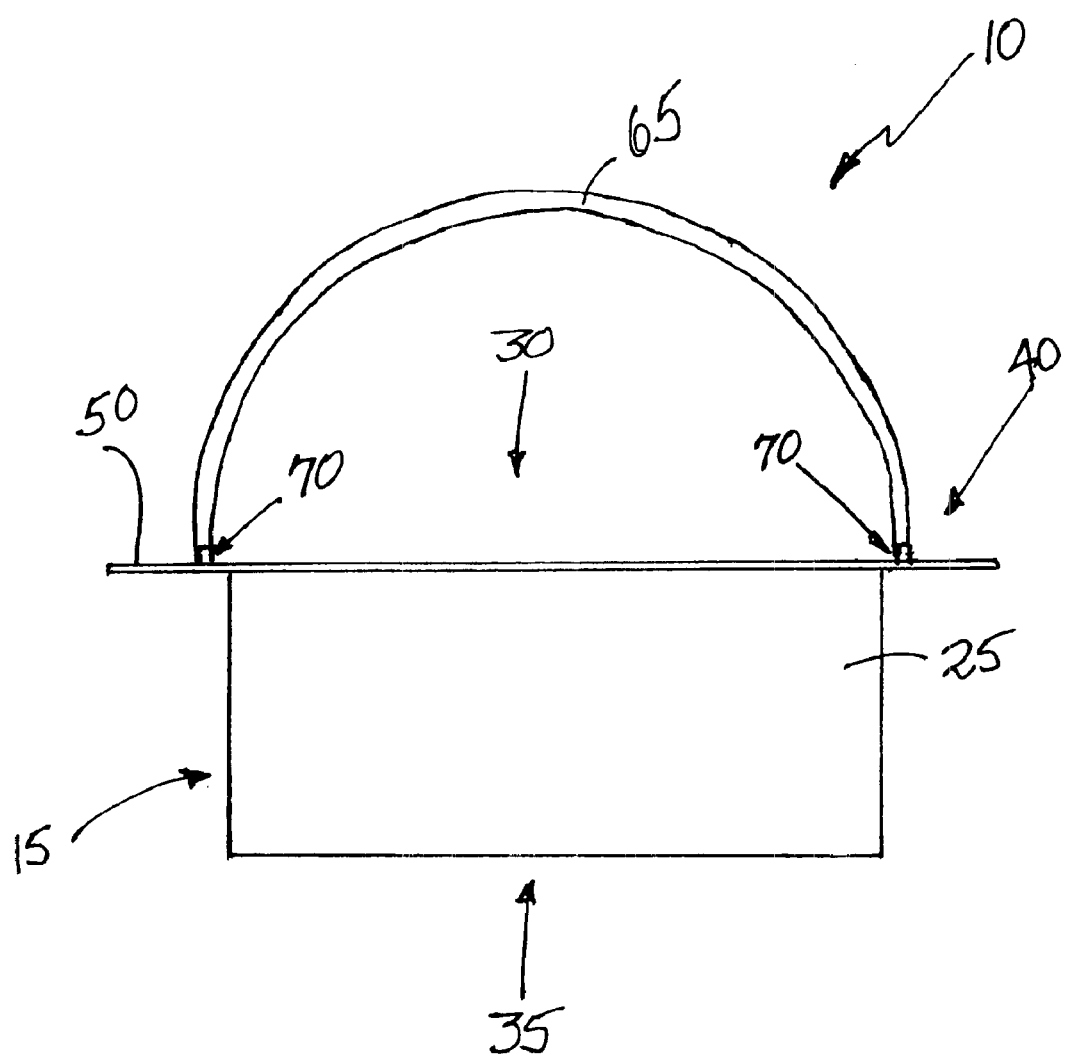
FIG. 2 is a side view of the one embodiment of the camera line support device of the present invention.
Figure 3:
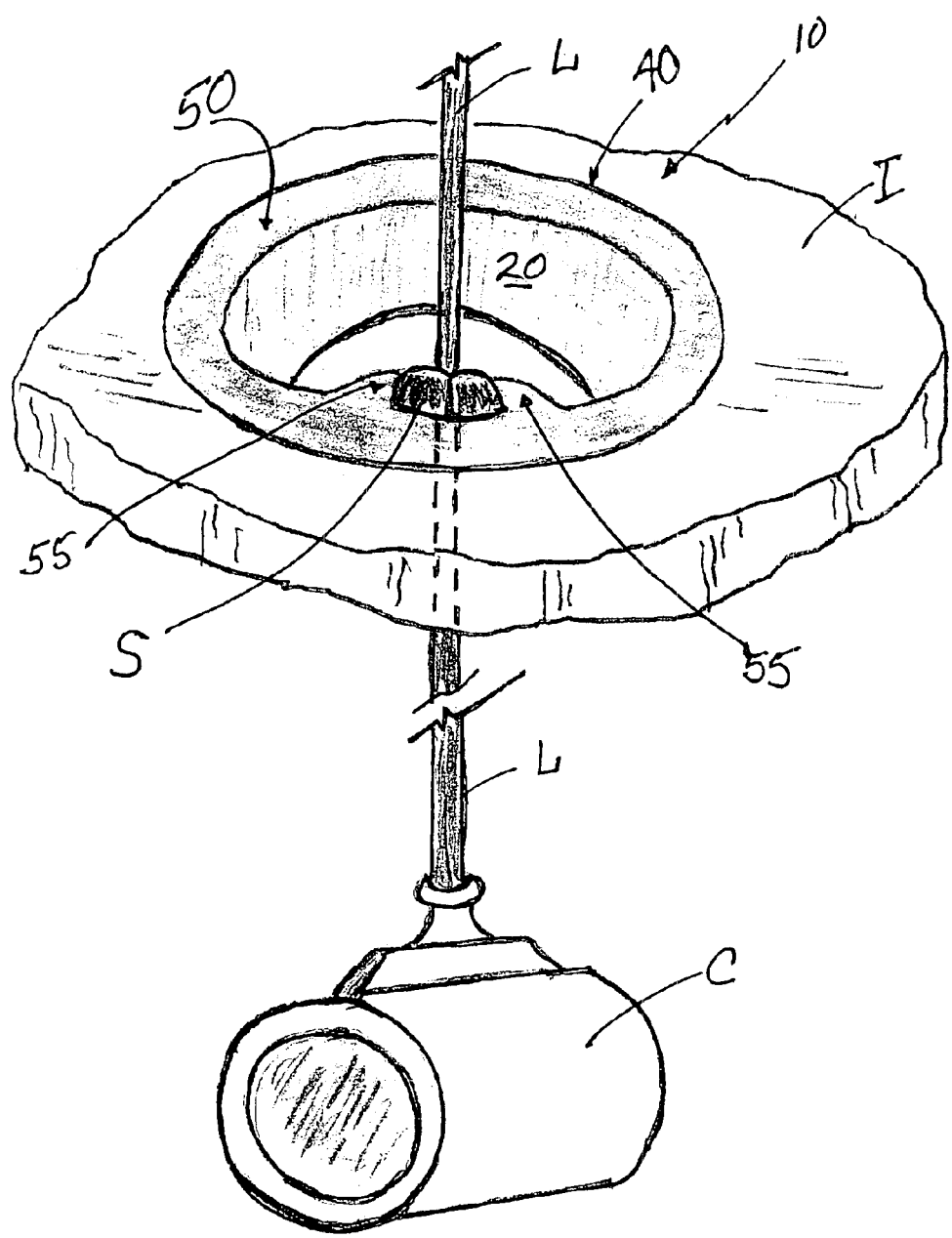
FIG. 3 is a perspective view of the one embodiment of the camera line support device of the present invention supporting an underwater camera below a hole in the ice.

Referring now to FIGS. 1–3, one embodiment of the camera line support device 10 includes a cylindrical sleeve member 15 having an inner surface 20, an outer surface 25, an open top end 30 and an open bottom end 35. A sleeve support member 40 is secured to the sleeve member's outer surface 25, adjacent the open top end 30 thereof. In the embodiment of FIGS. 1–3, the sleeve support member 40 includes a continuous flange member 50 encircling the sleeve member's outer surface 20, adjacent the open top end 30. Most preferably, the continuous flange member 50 is secured coplanar with the sleeve member's open top end 30, as illustrated in FIGS. 2 and 3. A protruding tab member 55 extends from the cylindrical sleeve member 15. The tab member 55 has a slot 60 therein. The slot 60 is adapted to accept a video camera cable line L therein, with the cable line L extending through the cylindrical sleeve member 15. In the embodiment of FIGS. 1–3, the tab member 55 intersects the inner surface 20 of the cylindrical sleeve member 15, adjacent the open top end 30 thereof. Finally, there is a carrying handle member 65, pivotally attached to the sleeve support member 40 for positioning and transporting the camera line support device 10. Preferably, the carrying handle member 65 is pivotally attached to the sleeve support member 40 at points on opposite sides of the cylindrical sleeve member 15, as illustrated in FIGS. 1–3. Most preferably, the cylindrical sleeve member 15, the sleeve support member 40 and the protruding tab member 55 are fabricated from a polymer resin as a unitary structure for strength and durability.

The camera line support device 10 is adapted for use in an ice fishing hole to suspend an underwater video camera C at a selected depth. The cylindrical sleeve member 15 of the support device 10 is placed into a suitably sized ice fishing hole with the sleeve support member 40 contacting the ice surface adjacent to the hole, as illustrated in FIG. 3. The underwater video camera C is lowered through the cylindrical sleeve member 15 by the cable line L, connecting the camera C to the electronics unit E of the camera system. The cable line L is positioned in the slot 60 of the protruding tab member 55, and a stop S is attached to the cable line L above the tab member 55. The stop S is preferably a device that grips the cable line L securely, but is readily moved along the cable line L to allow a variable length of cable line L to descend through the slot 60 of the tab member 55. For example, the stop S includes a compressible rubber cylinder having a slit into which the cable line L fits snugly, with the stop S readily moved from one point to another on the cable line L. The stop S contacts the tab member 55, thereby maintaining the underwater camera C at a selected depth.

Figure 7:
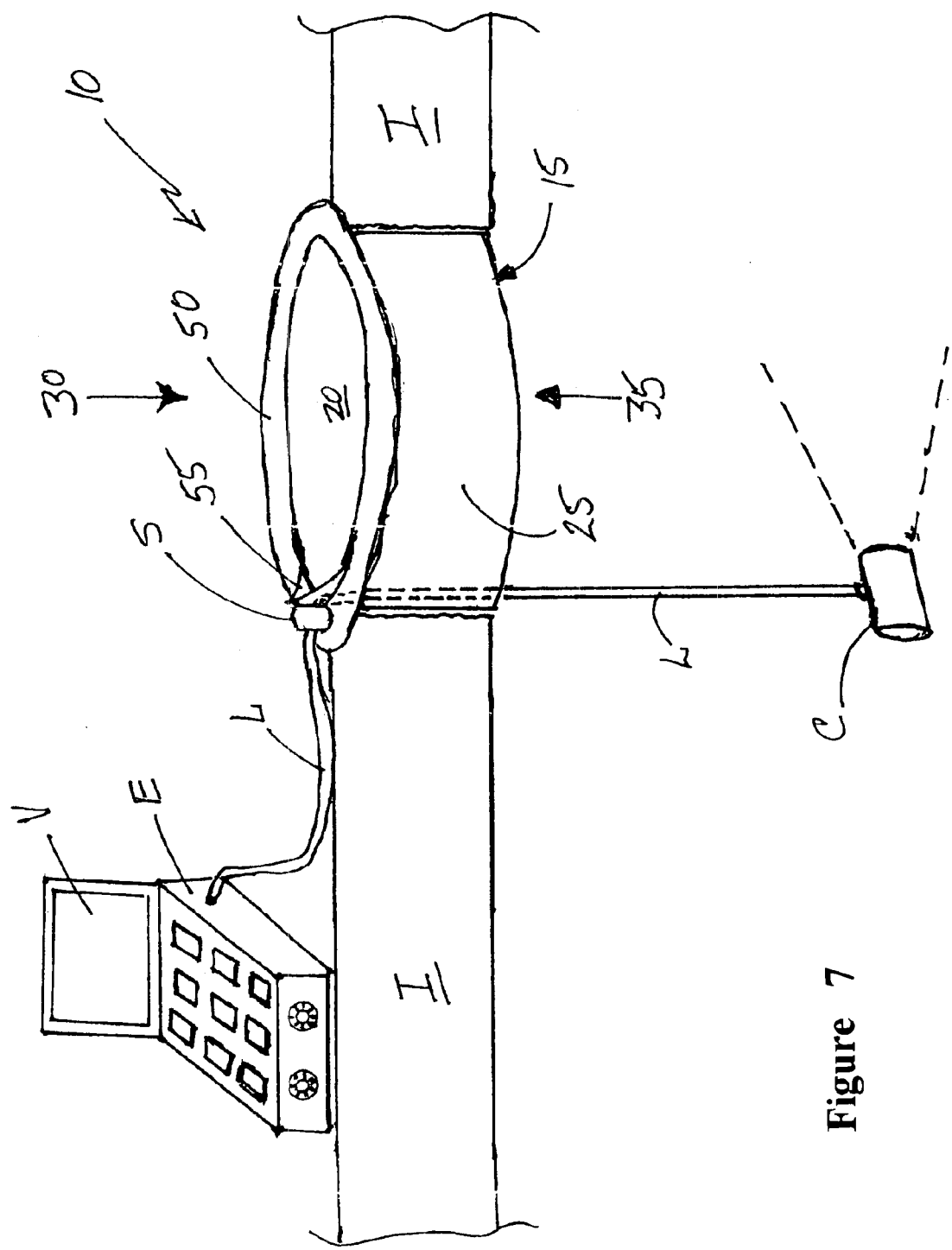
FIG. 7 is a perspective side view of the camera line support device embodiment of FIG. 5 of the present invention, supporting an underwater camera below a hole in the ice.
Figure 8:
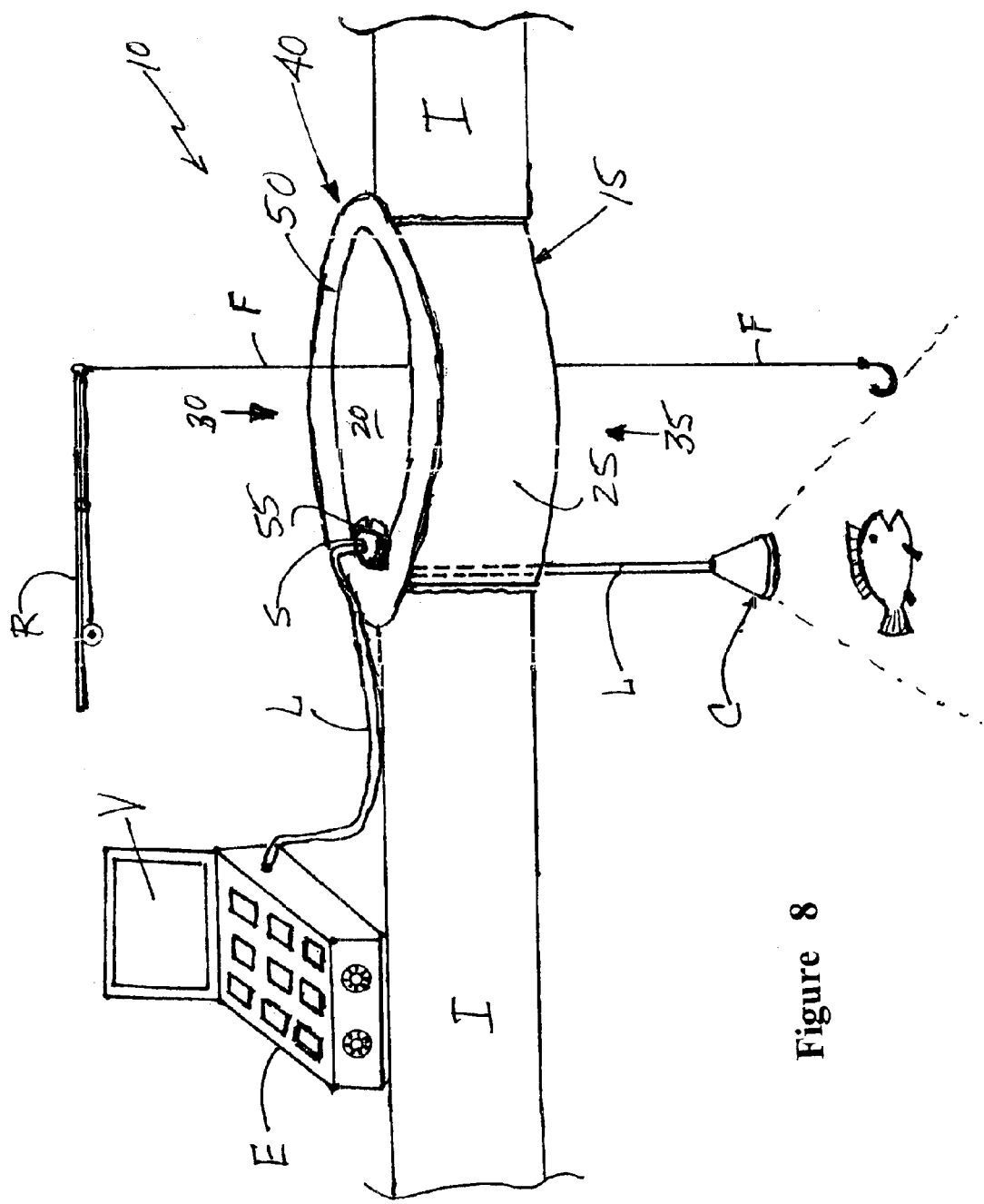
FIG. 8 is a perspective side view of the camera line support device embodiment of FIG. 1 of the present invention, supporting an underwater camera below an ice fishing hole.
Figure 9:
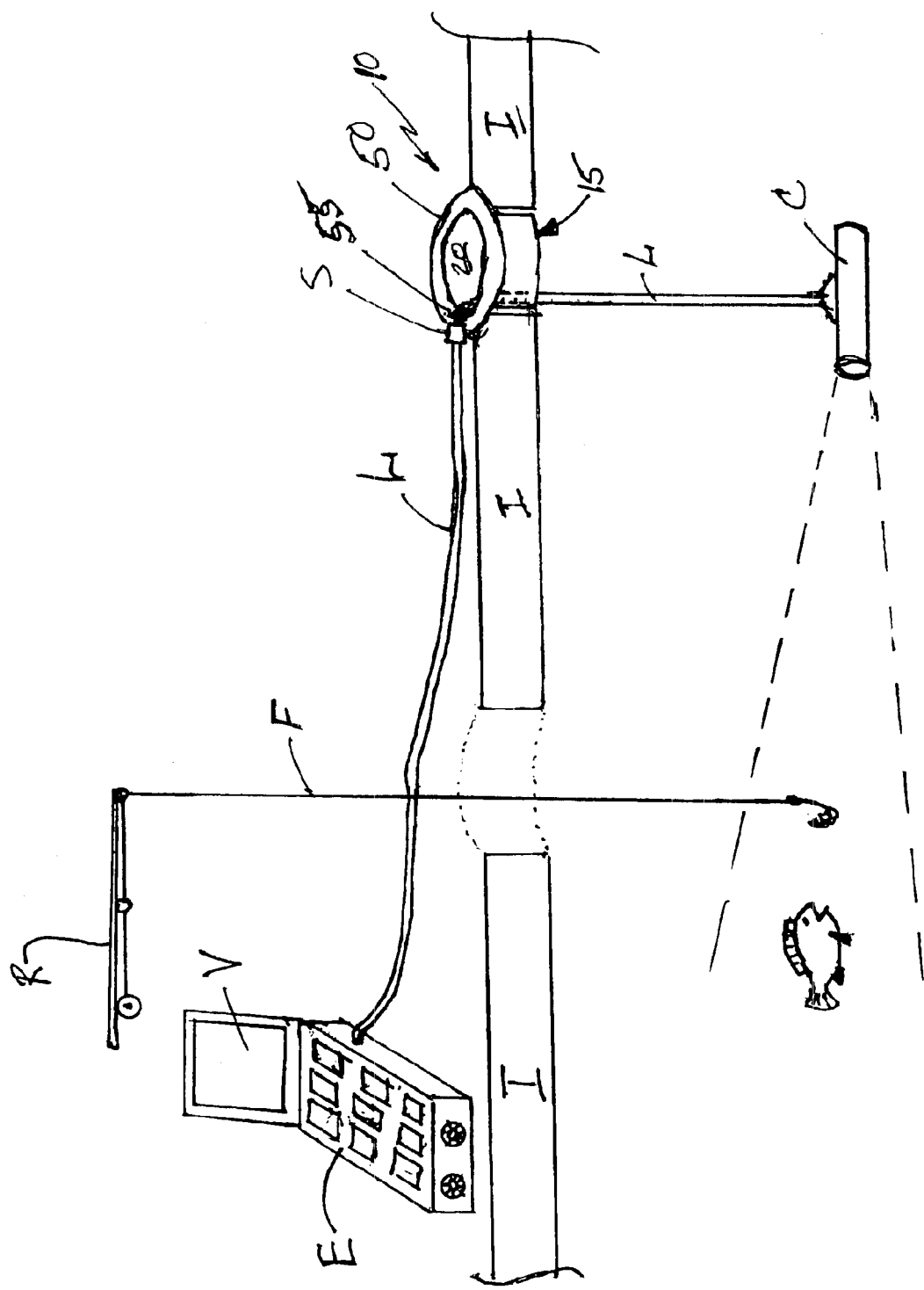
FIG. 9 is a perspective side view of the camera line support device embodiment of FIG. 5 of the present invention, supporting an underwater camera below an observation hole in the ice.

The positioning of the cable line L at the end of the slot 60, adjacent the inner surface 20 of the sleeve member 15, provides maximum clearance for the fisherman to drop a fishing line and bait down through the cylindrical sleeve member 15 for catching fish. The underwater camera C provides a view of the fishing bait and any approaching fish on a viewing screen V mounted on the electronics unit E of the camera system, as illustrated in FIGS. 7–9. Should the fisherman decide to move to another ice fishing hole, the camera line support device 10 is easily removed from the original ice fishing hole by grasping the carrying handle member 65 to remove the device 10 from one hole and place the device 10 in another hole. Likewise, the carrying handle member 65 facilitates removal of the device 10 from an ice fishing hole when the fisherman quits fishing.

Figure 4:
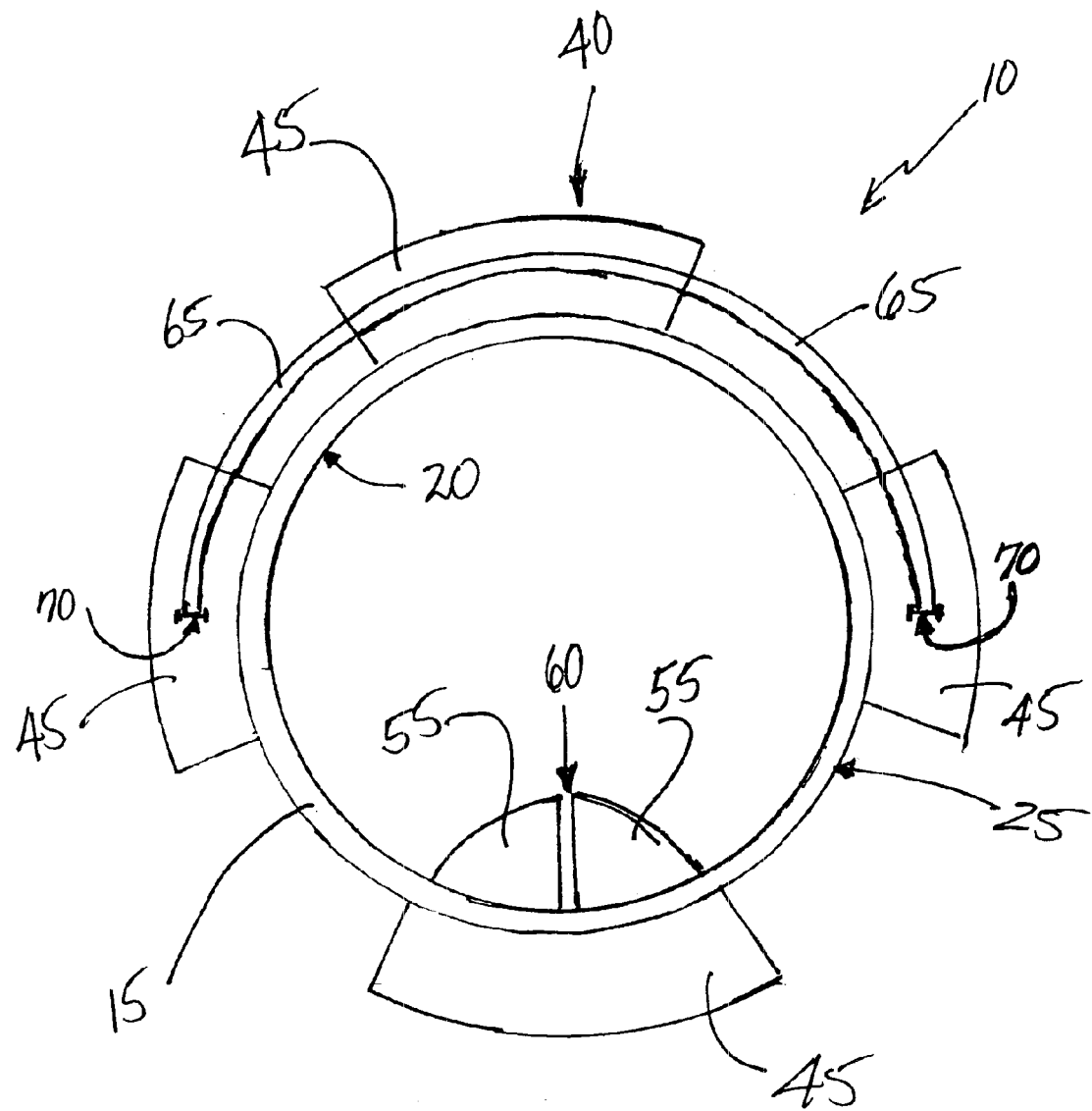
FIG. 4 is a top plan view of an alternative embodiment of the camera line support device of the present invention.

Referring now to FIG. 4, an alternative embodiment of the invention is shown. The camera line support device 10 includes a cylindrical sleeve member 15 having an inner surface 20, an outer surface 25, an open top end 30 and an open bottom end 35. A sleeve support member 40 is secured to the sleeve member's outer surface 25, adjacent the open top end 30 thereof. In the embodiment of FIG. 4, the sleeve support member 40 includes a plurality of coplanar, projecting members 45 extending radially from the sleeve member's outer surface 25, adjacent the open top end 30 thereof. Preferably, the coplanar, projecting members 45 are evenly spaced about the sleeve member's outer surface 25 and coplanar with the open top end 30 thereof. Although the projecting members 45 are shown as generally rectangular, a variety of shapes for the projecting members 45 can be employed with equivalent results.

In the embodiment of FIG. 4, the slot-containing tab member 55 intersects the inner surface 20 of the cylindrical sleeve member 15, adjacent the open top end 30 thereof. The carrying handle member 65 is pivotally attached to the sleeve support member 40 for positioning and transporting the camera line support device 10. Preferably, the carrying handle member 65 is pivotally attached to the projecting members 45 at points on opposite sides of the cylindrical sleeve member 15, as illustrated in FIG. 4. Most preferably, the cylindrical sleeve member 15, the projecting members 45 and the protruding tab member 55 are fabricated from a polymer resin as a unitary structure for strength and durability.

Figure 5:
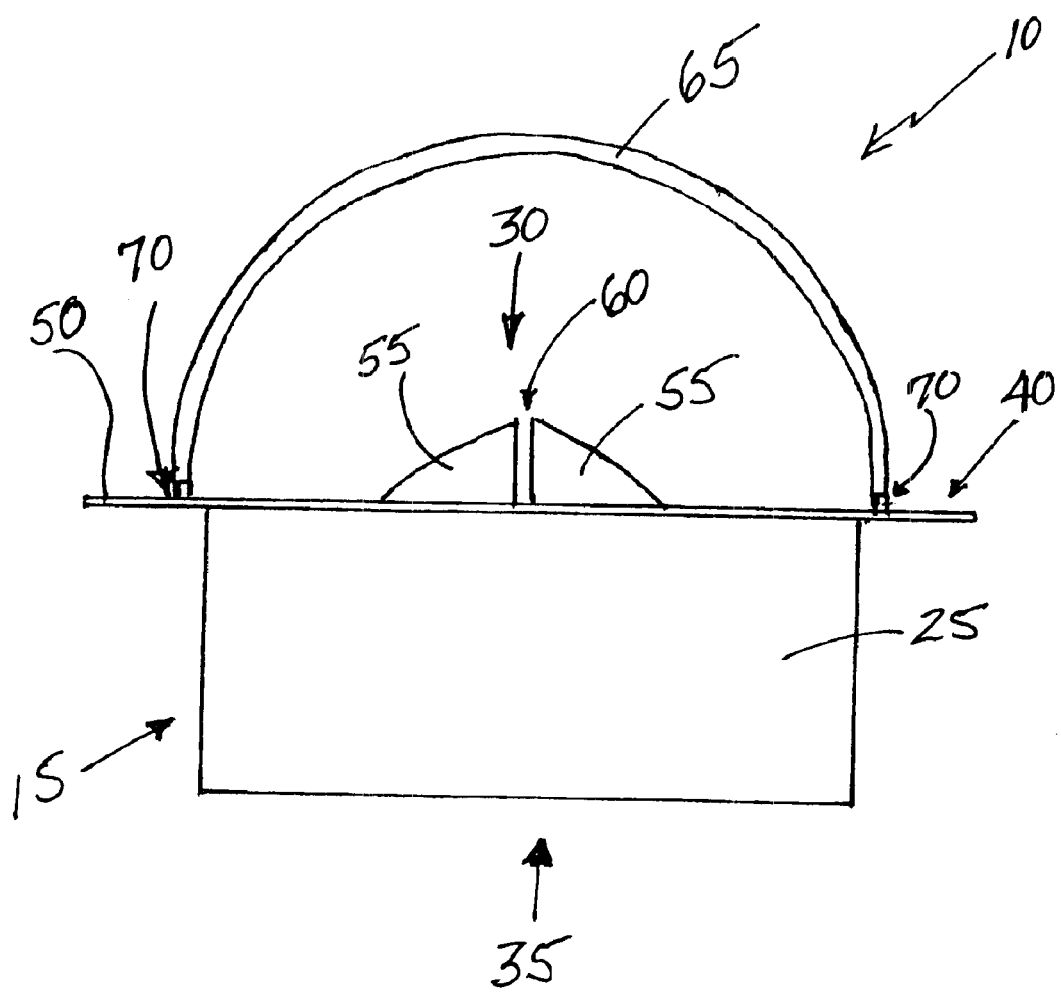
FIG. 5 is a side view of another embodiment of the camera line support device of the present invention.
Figure 6:
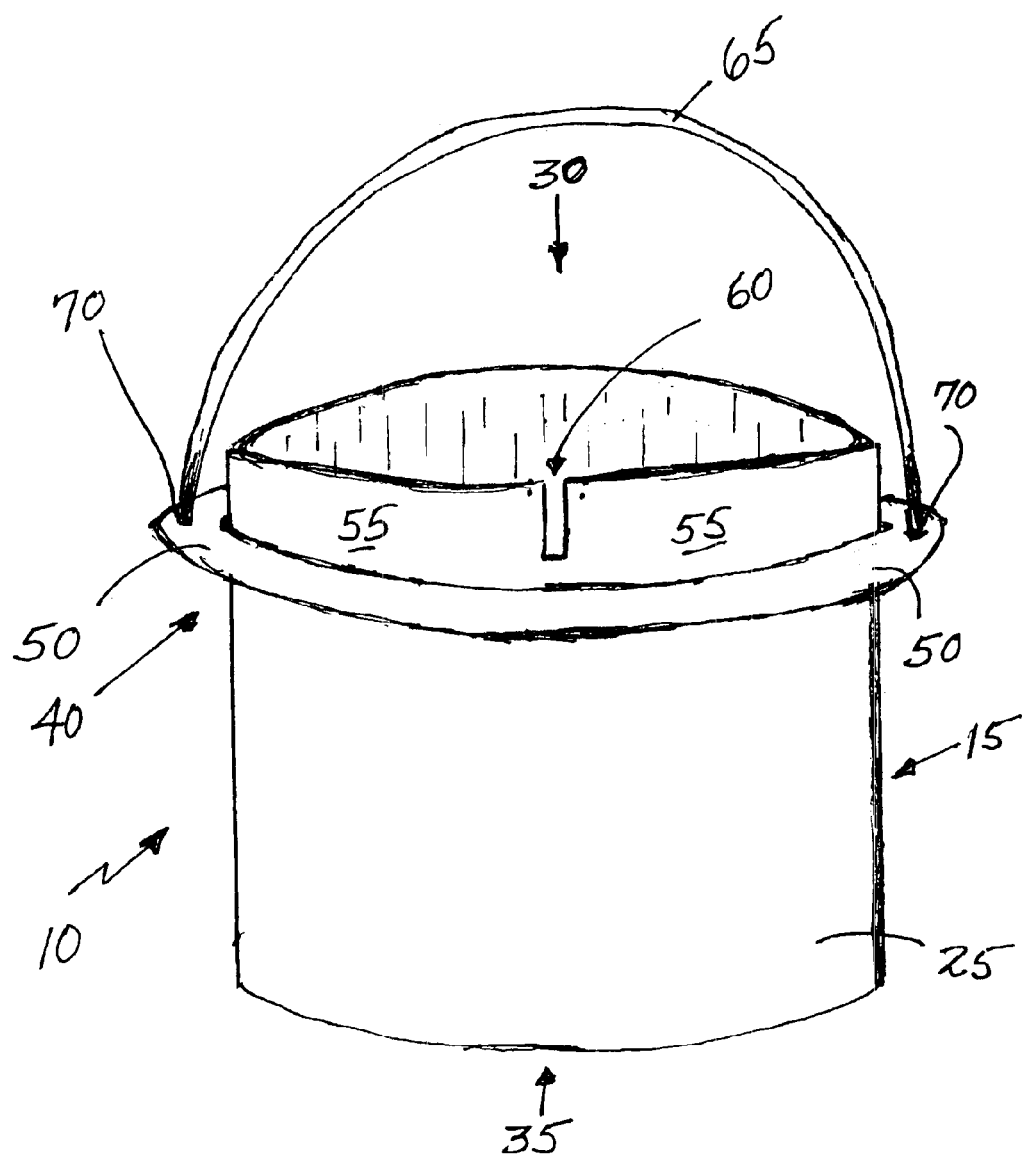
FIG. 6 is a side view of yet another embodiment of the camera line support device of the present invention.

Referring now to FIGS. 5–7, yet another embodiment of the invention is shown. The camera line support device 10 includes a cylindrical sleeve member 15 having an inner surface 20, an outer surface 25, an open top end 30 and an open bottom end 35. A sleeve support member 40 is secured to the sleeve member's outer surface 25, adjacent the open top end 30 thereof. In the embodiment of FIGS. 5–7, the sleeve support member 40 includes a continuous flange member 50 encircling the sleeve member's outer surface 20, adjacent the open top end 30. Most preferably, the continuous flange member 50 is secured coplanar with the sleeve member's open top end 30, as illustrated in FIGS. 5 and 7. A protruding tab member 55 extends from the cylindrical sleeve member 15. The tab member 55 has a slot 60 therein. The slot 60 is adapted to accept a video camera cable line L therein, with the cable line L extending through the cylindrical sleeve member 15. In the embodiment of FIGS. 5–7, the tab member 55 extends collinearly from the cylindrical sleeve member 15 adjacent the open top end 30 thereof. Finally, there is a carrying handle member 65 pivotally attached to the sleeve support member 40 for positioning and transporting the camera line support device 10. The collinear tab member 55 may extend from only a fraction of the circumference of the cylindrical sleeve member's open top end 30, as illustrated in FIGS. 5 and 7, or the collinear tab member 55 may extend completely around the circumference of the cylindrical sleeve member's open top end 30, as illustrated in FIG. 6.

Referring now to FIGS. 7–9, various embodiments of the camera line support device 10 are illustrated in use for ice fishing. In FIG. 7, the embodiment of the camera line support device 10, shown in FIG. 5, is positioned in an ice fishing hole with the protruding tab member 55 extending collinearly with the cylindrical sleeve member 15. The sleeve support member 40, in this case a continuous flange member 50, prevents the cylindrical sleeve member 15 from slipping through the ice fishing hole. The underwater camera C is suspended below the support device 10 by the cable line L, positioned within the slot 60 of the tab member 55 and held in position by the stop S attached to the cable line L. The camera system includes the electronics unit E connected to the cable line L with a viewing screen V, providing the underwater view seen by the camera C.

In FIG. 8, the embodiment of the camera line support device 10, shown in FIGS. 1–3, is positioned in an ice fishing hole with the protruding tab member 55 intersecting the inner surface 20 of the cylindrical sleeve member 15. The underwater camera C is suspended below the support device 10 by the cable line L, positioned within the slot 60 of the tab member 55 and held in position by the stop S attached to the cable line L. The camera system includes the electronics unit E connected to the cable line L, with a viewing screen V providing the underwater view seen by the camera C. In this illustration, the camera C is directed downwardly. The fisherman lowers a fishing line and bait down through the sleeve member 15. The underwater camera C provides a view of the fishing bait and any approaching fish on a viewing screen V, mounted on the electronics unit E of the camera system. The camera C and attached cable line L are maintained directly below the edge of the ice fishing hole and do not interfere with bringing a hooked fish up through the cylindrical sleeve member 15 of the camera line support device 10.

In FIG. 9, the embodiment of the camera line support device 10, shown in FIG. 5, is again positioned in an ice fishing hole with the protruding tab member 55 extending collinearly with the cylindrical sleeve member 15. The underwater camera C is suspended below the support device 10 by the cable line L, positioned within the slot 60 of the tab member 55 and held in position by the stop S attached to the cable line L. The camera system includes the electronics unit E connected to the cable line L, with a viewing screen V providing the underwater view seen by the camera C. In this instance, the fisherman is fishing in an adjacent ice fishing hole, with the camera C viewing the fishing bait and approaching fish at approximately the same depth but a short distance displaced from the fishing bait. The configuration allows the fisherman to bring a hooked fish up through the ice fishing hole without interference by the camera line support device 10, the camera C or the cable line L. This configuration requires the work of cutting a second hole for the camera line support device 10, the camera C and attached cable line L.

Because most powered ice augers contain a cutting end, having a diameter between about six (6) inches and about eight (8) inches, to produce an ice fishing hole of this diameter, it is preferred that the hollow cylindrical member 15 have a diameter of about five and one-half (5.5) inches to about seven and one-half (7.5) inches, to readily fit into such an ice fishing hole. Similarly, the sleeve support member 40 extends from the hollow cylindrical member 15 by about one (1) inch to about two (2) inches. Where the sleeve support member 40 includes a continuous flange member 50, the flange member 50 adds about two (2) inches to about four (4) inches to the diameter of the hollow cylindrical member 15, with the flange member 50 contacting the surface of the ice adjacent to the ice fishing hole. Where the sleeve support member 40 includes a plurality of projecting members 45 evenly spaced about the cylindrical member 15, each projecting member 45 extends about one (1) inch to about two (2) inches from the cylindrical member 15. The projecting members 45 add about two (2) inches to about four (4) inches to the diameter of the hollow cylindrical member 15, with each projecting member 45 contacting the surface of the ice adjacent to the ice fishing hole.

The length of the hollow, cylindrical sleeve member 15 below the sleeve support member 40, preferably, is between about two (2) inches and about ten (10) inches, and, most preferably, between about three (3) inches and about eight (8) inches.

The protruding tab member 55 extends about one (1) inch to about two (2) inches from the inner surface 20 of the cylindrical sleeve member 15 and, most preferably, extends about one and one-half (1.5) inches from the inner surface 20. The overall area of the tab member 55 protruding into the cylindrical sleeve member 15, preferably, is minimized to provide the maximum area for the open top end 30 of the sleeve member 15, thereby facilitating bringing a hooked fish up through the hollow cylindrical sleeve member 15. The overall area of the tab member 55, which is collinear with the cylindrical sleeve member 15, does not impact the area of the open top end 30 of the sleeve member 15.

The slot 60 of the protruding tab member 55 is preferably about one quarter (¼) inch wide with a length of about one and one-half (1.5) inches. The slot's one quarter (¼) inch width accommodates most cable lines L, and the one and one-half (1.5) inches length prevents the cable line L from slipping out.

While the invention has been particularly shown and described with reference to preferred embodiments thereof, it will be understood by those skilled in the art that various changes in form and details may be made therein without departing from the spirit and scope of the invention.

I claim:

1. A camera line support device, adapted for use in an ice fishing hole, comprising:
    a cylindrical sleeve member having an inner surface, an outer surface and open top end and bottom end;
    a sleeve support member secured to the sleeve member's outer surface adjacent the open top end thereof; and
    a protruding tab member extending from the cylindrical sleeve member, the tab member having a slot therein adapted to accept a video camera cable line therein, with the cable line extending through the cylindrical sleeve member.

2. The camera line support device, adapted for use in an ice fishing hole of claim 1, further including a carrying handle member pivotally affixed to the sleeve support member.

3. The camera line support device, adapted for use in an ice fishing hole of claim 1, wherein the sleeve support member includes a plurality of coplanar, projecting members extending radially from the sleeve member's outer surface adjacent the open top end thereof.

4. The camera line support device, adapted for use in an ice fishing hole of claim 3, wherein the coplanar, projecting members are evenly spaced about the sleeve member's outer surface adjacent the open top end thereof.

5. The camera line support device, adapted for use in an ice fishing hole of claim 1, wherein the sleeve support member includes a continuous flange member encircling the sleeve member's outer surface adjacent the open top end thereof.

6. The camera line support device, adapted for use in an ice fishing hole of claim 1, wherein the slot-containing, protruding tab member extends collinearly from the cylindrical sleeve member.

7. The camera line support device, adapted for use in an ice fishing hole of claim 6, wherein the slot-containing, protruding tab member extending collinearly from the cylindrical sleeve member encircles the sleeve member's open top end.

8. The camera line support device, adapted for use in an ice fishing hole of claim 1, wherein the slot-containing, protruding tab member intersects the inner surface of the cylindrical sleeve member.

9. The camera line support device, adapted for use in an ice fishing hole of claim 1, wherein the sleeve support member is secured coplanar with the sleeve member's open top.

10. The camera line support device, adapted for use in an ice fishing hole of claim 1, wherein the cylindrical sleeve member, the sleeve support member and the protruding tab member are fabricated from a polymer resin as a unitary structure.

11. A camera line support device, adapted for use in an ice fishing hole, comprising:
 a cylindrical sleeve member having an inner surface, an outer surface and open top and bottom ends;
 a sleeve support member secured to the sleeve member's outer surface adjacent the open top end thereof;
 a carrying handle member pivotally affixed to the sleeve support member; and
 a protruding tab member extending from the cylindrical sleeve member, the tab member having a slot therein adapted to accept a video camera cable line therein, with the cable line extending through the cylindrical sleeve member.

12. The camera line support device, adapted for use in an ice fishing hole of claim 11, wherein the sleeve support member includes a plurality of coplanar, projecting members extending radially from the sleeve member's outer surface adjacent the open top end thereof.

13. The camera line support device, adapted for use in an ice fishing hole of claim 12, wherein the coplanar, projecting members are evenly spaced about the sleeve member's outer surface adjacent the open top end thereof.

14. The camera line support device, adapted for use in an ice fishing hole of claim 11, wherein the sleeve support member includes a continuous flange member encircling the sleeve member's outer surface adjacent the open top end thereof.

15. The camera line support device, adapted for use in an ice fishing hole of claim 11, wherein the slot-containing, protruding tab member extends collinearly from the cylindrical sleeve member.

16. The camera line support device, adapted for use in an ice fishing hole of claim 15, wherein the slot-containing, protruding tab member extending collinearly from the cylindrical sleeve member encircles the sleeve member's open top end.

17. The camera line support device, adapted for use in an ice fishing hole of claim 11, wherein the slot-containing, protruding tab member intersects the inner surface of the cylindrical sleeve member.

18. The camera line support device, adapted for use in an ice fishing hole of claim 11, wherein the sleeve support member is secured coplanar with the sleeve member's open top.

19. The camera line support device, adapted for use in an ice fishing hole of claim 11, wherein the cylindrical sleeve member, the sleeve support member and the protruding tab member are fabricated from a polymer resin as a unitary structure.

20. A camera line support device, adapted for use in an ice fishing hole, comprising:
 a cylindrical sleeve member having an inner surface, an outer surface and open top and bottom ends;
 a sleeve support member secured to the sleeve member's outer surface, the sleeve support member including a continuous flange member encircling the sleeve member coplanar with the open top end thereof;
 a carrying handle member pivotally affixed to the sleeve support member;
 a protruding tab member extending from the cylindrical sleeve member and intersecting the inner surface thereof, the tab member having a slot therein adapted to accept a video camera cable line therein, with the cable line extending through the cylindrical sleeve member; and
 the cylindrical sleeve member, the sleeve support member and the protruding tab member fabricated from a polymer resin as a unitary structure.

* * * * *